Aug. 23, 1960

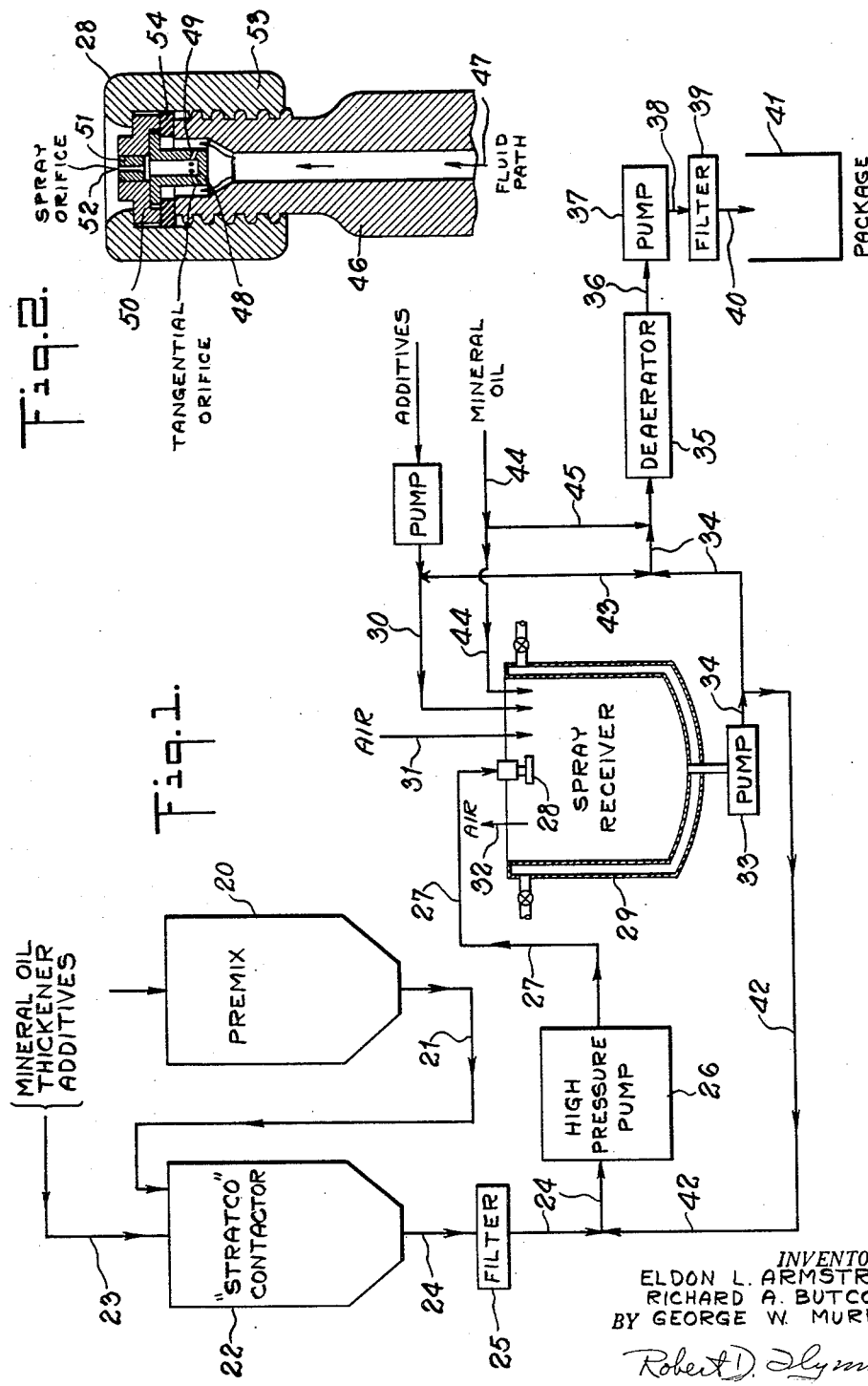

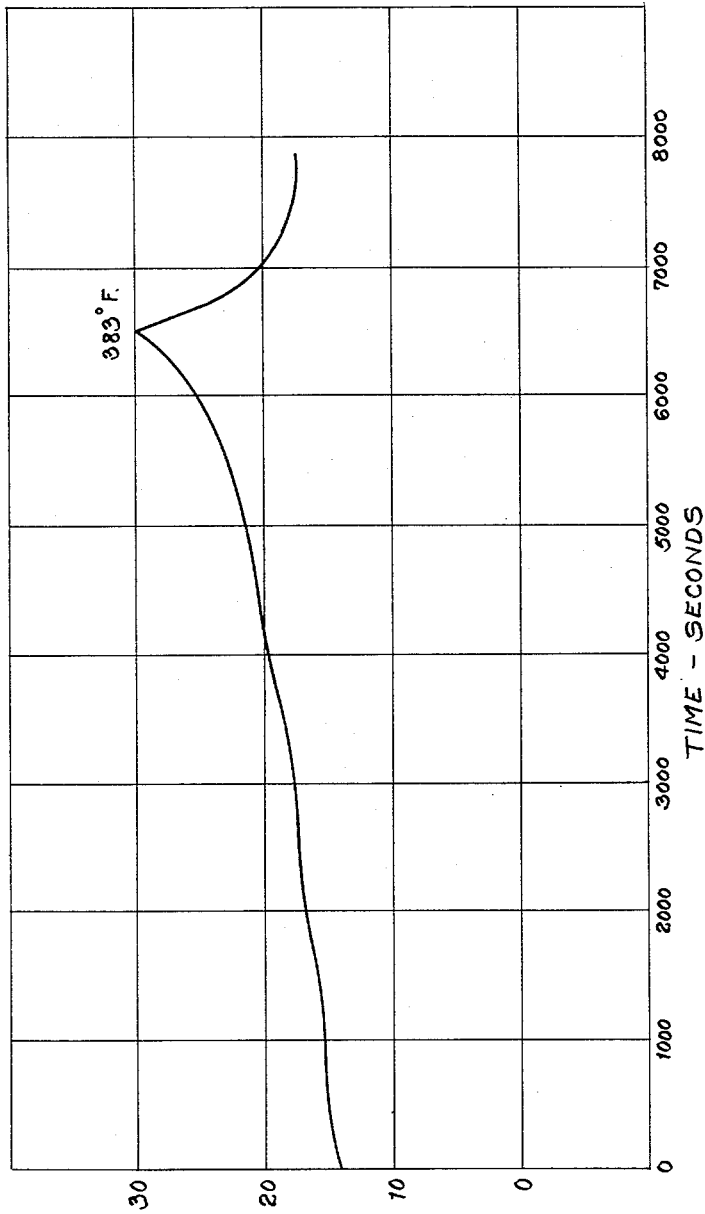

E. L. ARMSTRONG ET AL 2,950,248

GREASE MANUFACTURE INCLUDING MECHANICAL
ATOMIZATION OF THE CHARGE

Filed Sept. 6, 1957

ELDON L. ARMSTRONG
RICHARD A. BUTCOSK
GEORGE W. MURRAY
*INVENTORS*

*AGENT:*

ELDON L. ARMSTRONG
RICHARD A. BUTCOSK
GEORGE W. MURRAY
INVENTORS

AGENT:

ELDON L. ARMSTRONG
RICHARD A. BUTCOSK
GEORGE W. MURRAY
INVENTORS

AGENT:

ELDON L. ARMSTRONG
RICHARD A. BUTCOSK
GEORGE W. MURRAY
INVENTORS

ELDON L. ARMSTRONG
RICHARD A. BUTCOSK
GEORGE W. MURRAY
*INVENTORS*

AGENT:

United States Patent Office 2,950,248
Patented Aug. 23, 1960

2,950,248

GREASE MANUFACTURE INCLUDING MECHANICAL ATOMIZATION OF THE CHARGE

Eldon L. Armstrong, Garden City, Richard A. Butcosk, Uniondale, and George W. Murray, Jr., Pleasantville, N.Y., assignors to Socony Mobil Oil Company, Inc., a corporation of New York Filed Sept. 6, 1957, Ser. No. 682,461

24 Claims. (Cl. 252—32)

This invention is directed to the art of grease manufacture and is particularly concerned with methods for the continuous manufacture of greases.

This application is a continuation-in-part of our application Serial No. 458,158, filed September 24, 1954, and now abandoned.

Grease manufacture has been, and still is, for the most part, a batch process or at best a batch-continuous process. There have been many proposals for continuous operation. Few have made any impression upon the industry. To secure a competent commercial grease, composed of a thickening agent and an oleaginous vehicle, the thickening agent must be present in the final product in proper physical form and size, and it must be properly distributed throughout the product. Proper application of cooling cycles, physical working of the product at some stage or another of the cycle, and the like, normally have cancelled the time saving and equipment savings thought to be attainable by proposed continuous processes. So far as applicants are aware, no fully continuous process has made any substantial impact on the industry to date.

Typical of more recent proposals for continuous grease manufacture are various patents to H. G. Houlton, such as U.S. Patents 2,417,495 and 2,483,282 and U.S. Patent 2,433,636, to B. H. Thurman.

The Houlton patents set forth a system wherein a mixture of oil and thickening agent is heated with violent agitation to a temperature at which the soap is soluble in the oil, in a closed system, and then cooled, with simultaneous vigorous agitation, to a temperature below that at which gel formation, with development of the crystalline structure of the thickening agent, occurs. Intermediate of these two major steps there may be inserted a "flashing" operation, with release of pressure, for the removal of water, or air, or both, but this operation is so conducted that the grease composition, after "flashing" still is a solution of thickening agent in oil, and not yet a grease, for the formation and adjustment of the physical structure of the thickening agent occurs during cooling and agitation in the second step. The second Houlton patent presents a detailed discussion of the cooling with agitation procedure of their second step and its application to greases of various types. In both Houlton patents mention is made of forming droplets or streams of material and directing the same by centrifugal force over or against a cooling surface.

The Thurman Patent 2,433,636, is directed to making a soap in a waterborne system, "flashing" the soap product to remove water, and then admixing the molten soap with the oleaginous vehicle to produce, after working and cooling, a commercial grease. Part or all of the oil may be present in the oil-molten soap mixture after "flashing" and it is said that this may be cooled, if all of the desired oil is present, to form a grease. The "flashing" operation is conducted on a soap product maintained at a temperature between 350 and 550° F. and as high a temperature as 700° F. All of such temperatures are stated to be above the melting point of the anhydrous soaps, and to be above the "transition" temperatures of the grease systems. In view of Houlton, and the common knowledge of the grease art on control of thickening agent structure, it is difficult to conceive that mere cooling of such a mixture of oil and molten soap could become a commercially competent grease.

This invention is based upon the discovery that, contrary to prior teachings of the foregoing nature, a grease of excellent character can be produced by the following new technique. A mixture of oil and soap-forming material is constituted such that the soap is formed in situ in the oil; this mixture is maintained at a temperature above, at, or below its solution temperature as the soap is formed. The mixture, at a temperature below its solution temperature, is subjected to a vigorous mechanical atomization to form dispersed droplets which are brought into direct contact with a surrounding atmosphere to effect heat transfer by convection, whereupon a grease is obtained. When the mixture of oil and a soap (or soaps) is anhydrous, the atomization thereof into a substantially cooler surrounding atmosphere makes possible an essentially simultaneous homogenization and cooling of the grease. When the mixture is one of oil and a wet soap (or soaps), there is a three-fold result achieved by so atomizing the mixture, namely, essentially simultaneous dehydration, homogenization and cooling.

It has also been found that improved results are obtained by maintaining a mixture of oil and soap-forming material at a temperature below its solution temperature as the soap is formed, and thereafter subjecting it to atomization while it is at a temperature below its solution temperature.

As used herein, "solution temperature" is that temperature at which substantially complete solution of a soap gelling agent in the liquid lubricant occurs. Thus, it is that temperature at which the soap gelling agent is present as discrete molecules or at most molecular aggregates (crystal nuclei) approximating colloidal dimensions in size. As a further expression, it is that temperature at which the Tyndall beam disappers in the mixture.

It is to be understood, therefore, that in the process of the present invention, a mixture of oil and soap-forming material is constituted or formed at a temperature above, at, or below the solution temperature of the mixture, and that the mixture is atomized while at a temperature below its solution temperature. As demonstrated hereinafter, the solution temperature should not be reached when the mixture is atomized. In general, temperatures used herein for atomization are from about 10° F. to about 100° F. below the solution temperature of the mixture involved, preferably from about 20° F. to about 50° F. therebelow. When the mixture contains a wet soap, it is necessary that the minimum temperature for the mechanical atomization be above the boiling point of water (212° F.), preferably above 250° F. As a further guide, when a complex soap, such as a calcium stearate-calcium acetate as shown by Carmichael et al. in U.S. Patent No. 2,197,263, is used, the temperature so maintained will be below the lowest of the solution temperature, the decomposition temperature of the anhydrous complex soap, and the melting point of the anhydrous complex soap. For example, it has been found that the solution temperature of a particular calcium stearate-calcium acetate complex soap in mineral oil is of the order of 600° F.

This invention, therefore, has for its principal object the provision of a continuous grease making process in which the conversion of a mixture of soap or complex soap thickening agent and oil, to a grease is accomplished in a substantially instantaneous manner.

Other objects include simplification of the process and equipment used for grease manufacture by provision of a manufacturing procedure employing a minimum number of steps.

Other objects are in part obvious and in part will be noted hereinafter.

In order to more readily understand this invention, reference is now made to the drawings which are attached to and form a part of this specification.

In these drawings,

Figure 1 shows, in highly diagrammatic form, a set-up of equipment for practicing the invention.

Figure 2 shows a cross-section of a high pressure atomizing spray nozzle of a type useful in the practice of this invention.

Figure 4:
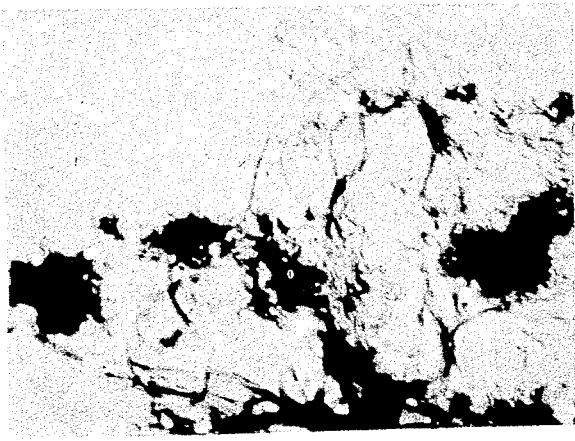

Figure 3 shows a typical differential thermal analysis curve of a grease (Example V), revealing the solution temperature thereof as 383° F. Differential thermal analysis is described by D. B. Cox and J. F. McGlynn in Analytical Chemistry, volume 29, pages 960–963, June 1957.

Figures 4 to 13 show, by means of electron micrographs, certain features of grease structure. The micrographs were taken at approximately 13,000 times magnification, shadowed with uranium.

Turning to Figure 1, 20 denotes a premix chamber, in which the grease constituents, i.e., part or all of the constituents expected to be present in the finished grease, are mixed. These constituents will be the mineral oil or the oleginous material, the thickening agent components, and additives, such as antioxidants and the like. The thickening agent components or soap-forming ingredients which can be fatty acids, glycerides and the like, and appropriate metal components such as lime flour, sodium hydroxide, lithium hydroxide monohydrate, and the like, are incorporated in the mixture. The ultimate mixture of ingredients arrived at in 20 is then passed by pipe 21, to a heater 22. In case the heater is some such equipment as for example the "Stratco contactor," supplied by the Stratford Engineering Company and well known in the art, in which adequate mixing accompanies heating, the ingredients may be added simultaneously, using known proportioning equipment, to heater 22 through pipe 23. Heater 22 may also be a conventional grease pressure kettle or autoclave, equipped with efficient agitation. In heater 22 the mixture is heated, under a super-atmospheric pressure of the order of 125 p.s.i., or at least sufficient to prevent escape of volatile constituents or reaction products, to a temperature and for a time sufficient to ensure completion of any desired reaction, such as neutralization or saponification. A line (not shown) can be provided at the top of contactor 22, to serve as a vent, should it be desired to control pressure in the contactor or to allow part of the water or other volatile material in the charge to escape. This temperature will ordinarily be of the order of 300–400° F. The temperature of the heated mixture is maintained above, at or below its solution temperature, as stated above. The heated mixture, still under pressure, is then passed through pipe 24 to filter 25. This filter may be any of the conventional filters known in the art. The heated product, after filtration, passes through high pressure pump 26, preferably of positive displacement type, and is discharged therefrom, at pressures of the order of 500 p.s.i. and upwards through pipe 27 to a mechanical dispersion device, such as a high pressure atomizing nozzle 28. The temperature of the product in pipe 27 is adjusted if necessary, in order that it be below the solution temperature of the product as the product is delivered to the atomizing nozzle 28. Thus, if the soap has been formed in 22 at a temperature below the solution temperature, no temperature adjustment need be made. Had the soap been formed in 22 at a temperature above or at the solution temperature, the product in pipe 27 is cooled, as by passage through a heat exchanger ((not shown) attached to 27, before the product is delivered to nozzle 28. The finely dispersed droplets from 28 are collected in vessel 29. Normally, vessel 29 is a conventional grease kettle.

If desired, certain additives which are not heat stable and which it would not be desirable to subject to the heating step, can be charged to spray receiver 29 through pipe 30.

Air is added to spray receiver 29 through inlet 31, and leaves 29 through outlet 32. Air serves as the cooling atmosphere for heat exchange by convection and serves to sweep out of receiver 29 steam and water vapor separated from the product emerging from nozzle 28. In general, from about 0.5 to about 10 pounds of air are added (through inlet 31) per pound of grease; preferably, from about 1 to about 4 pounds of air per pound of grease are so added. As the product is discharged from the nozzle 28 into receiver 29, if the product is wet, substantial dehydration occurs. Thus, the heated mixture in line 27 is subjected to mechanical atomization into dispersed droplets, with concurrent dehydration when a wet soap is used. The dispersed droplets are cooled virtually instantaneously as they emerge from the discharge side of the nozzle, by convection heat exchange with the substantially cooler surrounding atmosphere maintained in receiver 29, particularly the atmosphere immediately adjacent nozzle 28. Some cooling is also obtained by virtue of the latent heat of vaporization supplied by the mixture charged to nozzle 28, in vaporizing the water released on atomization.

It is to understood that other heat exchange atmospheres can be used in place of air. For example, nitrogen, carbon dioxide, flue gas, steam and the like can be used.

The product collected in spray receiver 29 will have, as later demonstrated, a grease structure, and will be highly aerated in most cases. It will be picked up by pump 33, and passed through pipe 34 to deaeration in deaerator 35. If desired, additives such as those before mentioned, can be added to the grease in pipe 34 instead of to the grease in spray receiver 29. Deaerator 35 can be any of those usual in the art, such as a Morehouse deaerator, a Cornell cold grease homogenizer, a Kinney Heli-Quad vacuum pump, or of the type described by Brooke and Piazza in U.S. Patent No. 2,797,767. These devices usually operate on a vacuum principle. Grease emergent from the deaerator 35 through pipe 36 can be pumped by pump 37 and pipe 38 through a conventional finishing filter 39. The filtered grease is taken through pipe 40 and is packaged in equipment designated 41.

Modifications of the foregoing manufacture are provided in Figure 1. For example, should it be desired to respray the grease product collected in receiver 29, the product can be recycled through: pipes 34, 42 and 24, pump 26, pipe 27 and nozzle 28. By way of illustration, it may be desirable to recycle the grease product in order to further homogenize it, to further cool it or to further dry it. It is to be understood, too, that should a low pressure atomizing device 28 be used, such as one operating at a pressure of 30–300 p.s.i., further homogenization of the product in receiver 29 is advantageous. In such case, the mixture in line 24 can be charged to atomizer 28 under 30–300 p.s.i. pressure without passage through a high pressure pump such as 26. The product in 29 can then be sent through a homogenizer such as a Manton Gaulin unit (not shown) located in line 34 before deaerator 35.

As another modification, should it be deemed advisable to return the product in pipe 34 to receiver 29, it can be returned via: pipes 34, 43 and 30. Pipe 43 is shown as having a flow from pipe 34 to pipe 30 for the purpose indicated, and an opposite flow from pipe 30 to pipe 34. The latter provides a means for incorporating additives into the sprayed product, being passed into deaerator 35, should such be desired.

In the event, further quantities of oleaginous material are required to modify the product in receiver 29, such quantities can be added to receiver 29, as by pipe 44, or ahead of the deaerator 35, as by pipe 45.

Figure 2 of the drawings shows, in cross-section, an atomizing spray nozzle useful for the purpose indicated. This nozzle is found to be composed of a body 46 containing a flow passage 47. In the end of the flow passage there is a whirl chamber fitting 48, having two orifices 49—49, which are arranged tangentially, so that the material in whirl chamber 48 has a highly swirling motion. Above the whirl chamber 48 there is mounted an orifice plate 50, having a central button of hard material 51, in which there is spray orifice 52. The whirl chamber 48 and orifice plate 50 are held to the body by sleeve 53, sealing being secured by gasket 54. The entire fitting is of extremely heavy construction, being designed for pressures in the passage 47 of several thousands of pounds per square inch. The diameter of one spray orifice 52 found useful in the present process is 0.033 inch.

An atomizing spray nozzle is only one form of equipment found useful at this point. What is needed is a mechanism capable of mechanically dispersing the stream of material into dispersed droplets. Several types of equipment, well known in the atomization art, such as the high pressure spray nozzle described, jet nozzles, centrifugal spray nozzles, centrifugal atomizing disc structures, pneumatic atomizers, other types of multi-stream atomizers, impact type nozzles, and the like, may be used.

Returning now to Figure 1 of the drawings, attention will be brought to certain modifications of the process.

The first of these is that in many circumstances, it will be found advisable to produce the grease with only a portion of the oil present. Some of these reasons are as follows:

A better grease can be obtained in many cases with less than all of the oil present at the time of establishment of the thickener structure. When the oleaginous constituent of the final grease is comprised of more than one oil, it may be desirable to establish the grease in the presence of only one of the oils in order to establish better structure. In such event, one oil can be added through line 23 and another oil can be added through line 44.

The throughput capacity of the atomizing step is of course a limiting factor. In many cases the finished grease capacity of the plant as a whole can be stepped up by adding more oil after the grease structure is established, as is customary in conventional grease making.

Also, as is well known in the grease making art, sometimes the establishment of a crystalline form of the thickener and its dispersion into the oil are not enough. With some grease thickener structures it is also necessary to allow a period of time, at a controlled temperature, the length of which varies with such things as nature of thickener, percentage of thickener, nature of the oleaginous material, and the like, to permit growth and proper size distribution of the thickener crystals to be obtained. In such cases this necessary "dwell" time can be gotten by proper design of the capacity of the spray receiver 29 in relation to the throughput rate of the atomizing step. In many cases, no such provision of "dwell" time is necessary and the size of spray receiver 29 can be based only upon the mechanical demands of the pump 33 and the function of spray receiver 29 as a supply sump therefor. With desired cooling accomplished solely by the atomization step, and no "dwell" time requirement, the spray receiver 29 is the feed chamber of the deaerator 35.

Due to the wide nature of ingredients used in grease manufacture, ranging from heavy oils to oils of low viscosity, to the wide variations in thickening ingredients, and in amounts of thickening ingredients used, and the presence or absence of water, it is not possible to specify exactly in numerical quantities the various characteristics of the mechanical atomization operation. For example, the pressure necessary is, as a minimum, that required to prevent substantial separation from the mixture in pipe 27 of any volatile ingredient thereof before atomization. Above that it is dependent upon the flow characteristics of the mixture and to a very great extent upon the design of the mechanical atomizing device and upon the design of the auxiliary equipment delivering the mixture to the atomizing device. In the examples shown, with specific forms of high pressure spray atomizing nozzles, it ranged from 500 p.s.i. to 4000 p.s.i.; satisfactory operation has also been achieved with pressures as high as 8000 p.s.i.

The temperature to which the ingredient mixture is heated, and the time during which it is heated are those necessary to ensure reaction of the ingredients, if a soap, or soaps, are to be formed, and to bring the mixture to the desired temperature. For example, the time and temperature necessary to react soap-forming ingredients in oil in a pressure vessel with a high degree of agitation, will be different from the time and temperature necessary to react soap-forming ingredients in a kettle with a low degree of agitation.

As indicated hereinabove, it has been discovered that greases of improved character are obtained by subjecting the heated mixtures in line 27 to mechanical atomization, when such mixtures are at temperatures at least somewhat below their solution temperatures. Obviously, individual greases are characterized by different solution temperatures. For example, for a lithium-calcium grease of the character shown below in Example I, the solution temperature is about 366° F. The solution temperature of a sodium-calcium grease typified by that shown in Example II below, is above 480° F. Similarly, the calcium tallow-calcium acetate grease of Example III has a solution temperature of about 600° F. The sodium grease of Example IV has a solution temperature of about 392° F.–405° F. For the lithium grease of Example V and for the lithium-calcium grease of Example VI, the solution temperatures are about 383° F. and about 380° F., respectively.

The degree of convection heat exchange that is to be accomplished in co-ordination with the mechanical atomization step is also of importance. The temperature drop across the mechanical atomizing device can be gotten and controlled in several ways. A portion of this temperature drop may come from the energy balance around the spraying action or mechanical dispersion action itself. A major control will reside in the temperature control of the surrounding atmosphere. In many cases, with "wet" mixtures, i.e., where water is included in the mixture to be atomized, and particularly when a small, controlled, amount of water is desired in the finished grease, a small portion of the desired temperature drop will be gotten by controlled evaporation of water. A vaporizable material, such as a light hydrocarbon, or a volatile oil fraction, can be one of the starting ingredients, if for no other purpose than to utilize the cooling effect arising from its vaporization.

As mentioned earlier, cooling of the dispersed droplets discharged from nozzle 28 can be effected. Cooling is gained by contact of the dispersed droplets with the atmosphere (as air) surrounding the nozzle. To regulate the amount of cooling to be obtained, air at a prescribed temperature can be introduced into receiver 29 at a given rate through inlet 31. In general, air is brought in through inlet 31 at temperatures of the order of 40° F. to 120° F., at a rate of about 0.5 to 10 pounds of air per pound of grease atomized, preferably 1 to 4 pounds of air per pound of grease, in order to effect a cooling of from about 20° F. to about 300° F. It will be clear to those familiar with the art that such cooling control can be effected by numerous modifications of the procedure outlined here; however, the latter procedure is preferred herein.

Exemplary of this invention are the following illustrative examples.

EXAMPLE 1

Example 1 involves the manufacture of a lithium soap grease containing a minor proportion of a calcium soap.

*Lithium soap grease containing a minor proportion of calcium soap*

| Formula | No. 1 (Pounds) | No. 2 (Pounds) | No. 3 (Pounds) |
| --- | --- | --- | --- |
| Palmitic Acid | 0.66 | 0.70 | 0.70 |
| Stearic Acid | 8.55 | 8.50 | 8.50 |
| Oleic Acid | 0.29 | 0.30 | 0.30 |
| Lithium Hydroxide Monohydrate | 1.15 | 1.15 | 1.15 |
| Lime Flour | 0.50 | 0.50 | 0.50 |
| 750 SUS @ 100° F. Naphthenic Mineral Oil | 72.00 | 88.85 | 88.85 |
| Process Conditions: | | | |
| Temperature, ° F. in Stratco Contactor | 350 | 350 | 398 |
| Nozzle Pressure, p.s.i | 900 | 900 | 1000 |
| Temperature, ° F. before Nozzle Outlet | 310 | 310 | 370 |
| Temperature, ° F. after Atomization | 200 | 200 | 215 |
| Physical Properties of Finished Grease: | | | |
| Penetration, ASTM— | | | |
| Unworked | 239 | 292 | 262 |
| Worked, 60X | 264 | 322 | 270 |
| Worked, 50,000 Strokes, 1/16" Holes | 392 | 346 | 420+ (semifluid) |
| Rolling Stability—2 Hours— | | | |
| Micro Penetration, Initial | 70 | 103 | 73 |
| Micro Penetration, Final | 132 | 150 | 144 |
| Comments | (¹) | (¹) | Gel |

¹ Satisfactory grease.

In the above example, all of the ingredients shown for Formulae Nos. 1 and 2 were charged, at a temperature of about 150° F., to a vertical Stratco contactor, 100 pounds size and heated to 350° F., in a period of about 60 minutes. The heated mixture, at a temperature of 310° F., was passed through the nozzle of Figure 2 into an air atmosphere. The nozzle orifice size was 0.033 inch. The temperature after atomizing was 200° F. The atomized material was collected in a Dopp kettle (15 gallons), jacketed, with contra-rotating paddles and scraper blades. The atomized material, highly aerated, was pumped from the kettle and passed through a Cornell cold grease homogenizer, operating at a disc speed of 1800 r.p.m. and a chamber vacuum of 25–27 inches mercury. The effluent from the Cornell deaerator was a final product of satisfactory appearance and structure.

As mentioned above, the solution temperature for this grease is about 366° F. During the preparation of this grease, temperatures were kept below the solution temperature for Formulae Nos. 1 and 2.

By way of comparison, Formula No. 3 is shown. In this instance the temperatures in the contactor (398° F.) and during atomization (370° F.) were above the solution temperature.

Figure 5:
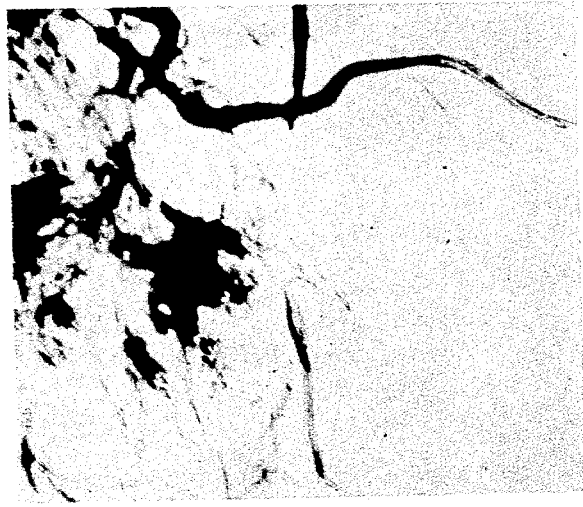
Figure 6:
Figure 7:
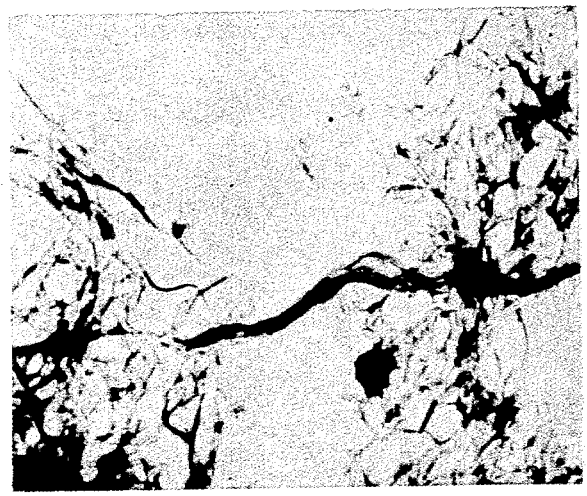
Figure 8:
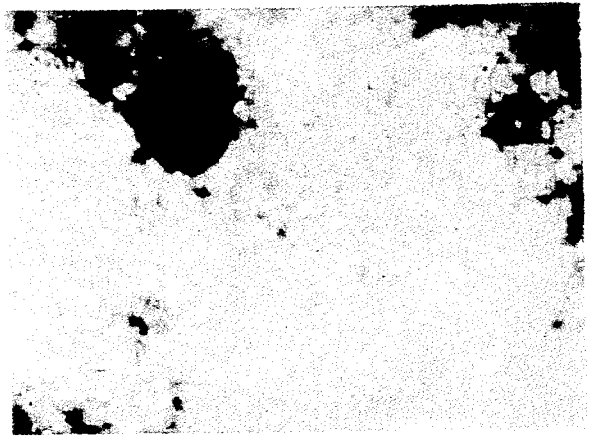

The differences between the products identified as Formulae 1 and 3 are shown by electron photomicrographs, Figures 4 to 8. Figures 4 and 5 are of the Formula 1 product, samples being taken after passage through the spray nozzle. Figures 6 and 7 are of the same grease, taken after the Cornell homogenizer. Figure 8 shows the Formula 3 product, taken after the Cornell homogenizer.

Comparison of Figures 4 and 5 with 6 and 7 of the electron photomicrographs shows conclusively that the final soap structure, namely, a mixture of small and medium fibers of the same structure, has been established in the sprayed product, and that it has undergone some refinement but is not essentially changed upon passage through the Cornell machine. Figures 4 and 5 demonstrate that the formation of grease structure is practically instantaneous upon passage through the mechanical atomization step at the spray nozzle.

In contrast to Figures 4 through 7, Figure 8 reveals a gel structure with practically no fibers in evidence.

The product was prepared by using temperatures above the solution temperature during the saponification step and the atomization step.

Figure 9:
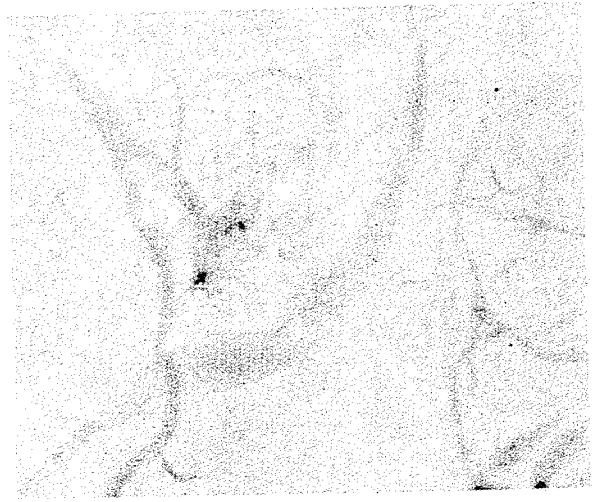
Figure 10:

Figures 9 and 10 are provided as a comparison with Figures 6 and 7, since 9 and 10 show samples taken of a conventionally prepared product formulated from the same ingredients. Thus, the grease structure established for a conventionally prepared grease (Figures 9 and 10) is of the same character as that established for the grease prepared by the new technique (Figures 6 and 7). In general, it has been noted that greases prepared by the new method have a more uniform and narrower distribution of fiber sizes than corresponding greases prepared by conventional methods.

A further comment on the products shown in Example 1 can be made. The data shown for the greases identified as Formulae Nos. 1 and 2, demonstrate their satisfactory character. In contrast, the data for the product—Formula No. 3—made by using an atomization temperature above the solution temperature, reveal poor mechanical stability in the worker test. That is, of the two generally accepted screening tests for mechanical stability, Formula No. 3 fails one of the same. Thus, the physical data is in harmony with the electron photomicrograph representation.

Penetration values shown above in the tabulation were obtained in accordance with ASTM Method D 217–48 "Cone Penetration of Lubricating Grease." The value for "roll stability" were determined by the procedure described by McFarlane in The Institute Spokesman, volume VI, No. 12, March 1, 1943.

EXAMPLE II

Example II shows the preparation and properties of a sodium-calcium soap grease. The manner of handling this grease was essentially the same as in Example I. All ingredients of Formulae Nos. 1 and 2 were charged to the Stratco contactor at about 150° F., heated to the indicated temperature, and discharged at the indicated conditions through the nozzle, receiving the same treatment thereafter.

*Sodium-calcium soap grease*

| Formula | No. 1, Wt. Percent | No. 2, Wt. Percent |
| --- | --- | --- |
| Myristic Acid | 0.4 | 0.4 |
| Palmitic Acid | 4.3 | 4.3 |
| Stearic Acid | 7.5 | 7.5 |
| Oleic Acid | 1.5 | 1.5 |
| Hydroxystearic Acid | 0.8 | 0.8 |
| $C_{20}$ and $C_{22}$ Acids (Fish Oil Acids) | 0.7 | 0.7 |
| Glycerine | 0.6 | 0.6 |
| Lime Flour | 0.5 | 0.5 |
| Sodium Hydroxide | 2.3 | 2.3 |
| 500 SUS @ 100° F. Solvent Refined Coastal Mineral Oil | 81.4 | 81.4 |
| Process Conditions: | | |
| Temperature, °F. in Stratco Contactor | 400 | 380 |
| Nozzle Pressure, p.s.i | 1,100 | 700 |
| Temperature, °F. before Nozzle Outlet | 355 | 310 |
| Temperature, °F. after Atomization | 260 | 220 |
| Physical Properties of Finished Grease: | | |
| Penetration, ASTM— | | |
| Unworked | 317 | 258 |
| Worked, 60X | 322 | 304 |
| Worked, 50,000 Strokes, 1/16" Holes | 378 | 399 |
| Roll Stability—2 Hours— | | |
| Micro Penetration, Initial | 118 | 76 |
| Micro Penetration, Final | 181 | 280 |
| Comments | Fibrous Grease | Smooth Grease |

The solution temperature of this grease is greater than about 480° F. By referring to the tabulation for Formulae Nos. 1 and 2, it is seen that the saponification and atomization temperatures were less than the solution temperature.

EXAMPLE III

Example III shows the preparation, by the method of this invention, of a calcium tallow-calcium acetate soap grease.

*Calcium tallow-calcium acetate soap grease*

| Formula for 100-Pound Batch | Wt. Percent |
|---|---|
| Tallow | 9.50 |
| Candelilla Wax | 2.70 |
| Glycerine | 1.40 |
| Glacial Acetic Acid | 2.70 |
| Lime Flour | 3.50 |
| 300 SUS @ 100° F. Acid Treated Naphthenic Mineral Oil | 80.20 |
| Process Conditions: | |
| Temperature, ° F. in Stratco Contactor | 400 |
| Nozzle Pressure, p.s.i. | 2,000 |
| Temperature, ° F. before Nozzle Outlet | 365 |
| Temperature, ° F. after Atomization | 300 |
| Physical Properties of Finished Grease: | |
| Penetration, ASTM— | |
| Unworked | 292 |
| Worked, 60X | 318 |
| Worked, 50,000 Strokes, 1/16" Holes | 382 |

Once again, all of the formula ingredients were charged at once to the Stratco contactor, and the procedure was essentially that described in above examples, heating to about 400° F. and atomized at 365° F., into a receiving vessel at 300° F. The nozzle used was of the same type as shown by Figure 2, but had an orifice size of 0.037 inch.

As indicated earlier, the solution temperature of this grease is about 600° F. It is seen, therefore, that the grease was prepared at temperatures well below the solution temperature.

EXAMPLE IV

Example IV shows the preparation of a sodium soap grease. In this case a 75 pound batch was processed, the details of processing being essentially the same as described in connection with Example I, except for heating and atomization temperatures, which were as indicated.

*Sodium soap grease*

| Formula for 75-Pound Batch | No. 1, Pounds | No. 2, Pounds |
|---|---|---|
| Tallow | 6.00 | 6.00 |
| Lard Oil | 0.75 | 0.75 |
| Hydrogenated Tallow | 4.50 | 4.50 |
| Sodium Hydroxide | 1.80 | 1.80 |
| 1280 SUS @ 100° F. 60 V.I. Mineral Oil | 62.09 | 62.00 |
| Process Conditions: | | |
| Temperature, ° F. in Stratco Contactor | 350 | 425 |
| Nozzle Pressure, p.s.i. | 700 | 700 |
| Temperature, ° F. before Nozzle Outlet | 310 | 350 |
| Temperature, ° F. after atomization | 260 | 300 |
| Physical Properties of Finished Grease: | | |
| Penetration, ASTM— | | |
| Unworked | 250 | 193 |
| Worked, 60X | 278 | 214 |
| Worked, 50,000 Strokes, 1/16" Holes | 394 | 365 |
| Rolling Stability—2 Hours— | | |
| Micro Penetration, Initial | 95 | 48 |
| Micro Penetration, Final | 170 | 100 |

It is to be noted that the solution temperature of this grease is of the order of 392–405° F. Temperatures used for the atomization step in the preparations—310° F. and 350° F.—were well below the solution temperature.

Comparison of the properties indicates preparation of two acceptable commercial greases.

EXAMPLE V

Example V demonstrates the preparation and properties of lithium hydroxystearate soap greases.

In the example, the procedure was essentially the same as that which is described in Example I. The nozzle used, however, was a grooved-core nozzle having four grooves, 0.016 inch by 0.024 inch, and having an orifice size of 0.0514 inch. All ingredients were charged to the Stratco contactor. Formula No. 1 was heated to 360° F. and was atomized at 330° F. Formula No. 2 was heated to 423° F. and was atomized at 360° F. Formula No. 3 was heated to 420° F. and was atomized at 383° F. In this example, cooling air was swept through the dispersed grease droplets emergent from the nozzle. Thus, the sprayed grease was cooled more than in Examples I–IV. Air was charged at a rate of about 100 cubic feet per minute, per pound of grease atomized. The temperature of the air, as charged, was about 80° F. The grease was deaerated by passing through the Cornell deaerator as in the previous examples.

*Lithium hydroxy stearate soap grease*

| Formula | No. 1, Wt. Percent | No. 2, Wt. Percent | No. 3, Wt. Percent |
|---|---|---|---|
| Hydrogenated Soya Bean Acids | 1.38 | 1.38 | 1.38 |
| Hydrogenated Castor Oil Fatty Acids | 5.38 | 5.38 | 5.38 |
| Lithium Hydroxide Monohydrate | 1.06 | 1.00 | 1.06 |
| Oxidation Inhibitor a | 0.18 | 0.20 | 0.20 |
| Naphthenic Mineral Oil, 750 SUS @ 100° F. | 92.00 | 92.04 | 91.98 |
| Process Conditions: | | | |
| Temperature, ° F., in Stratco Contactor | 360 | 423 | 420 |
| Nozzle Pressure, p.s.i. | 2,400–3,000 | 3,400–3,900 | 3,600–4,000 |
| Temperature before Nozzle Outlet, ° F. | 330 | 360 | 383 |
| Temperature after Atomization, ° F. | 200 | 218 | 202 |
| Physical Properties of Finished Grease: | | | |
| Penetration, ASTM— | | | |
| Unworked | 297 | 330 | 376 |
| Worked 60X | 307 | 343 | 390 |
| 50,000 X 1/16" Holes | 338 | 372 | 400 |
| Rolling Stability Test— | | | |
| Micro Penetration—Initial | 106 | 128 | 188 |
| Micro Penetration—After 2 Hours | 135 | 188 | 330 | a This is a mixture of mono and diheptyl diphenylamines.

Figure 11:
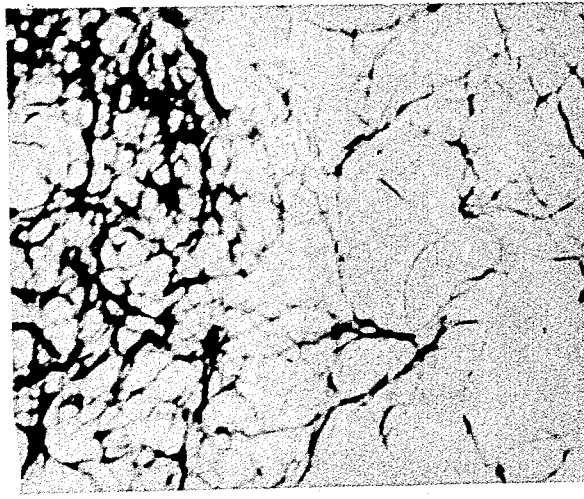
Figure 12:
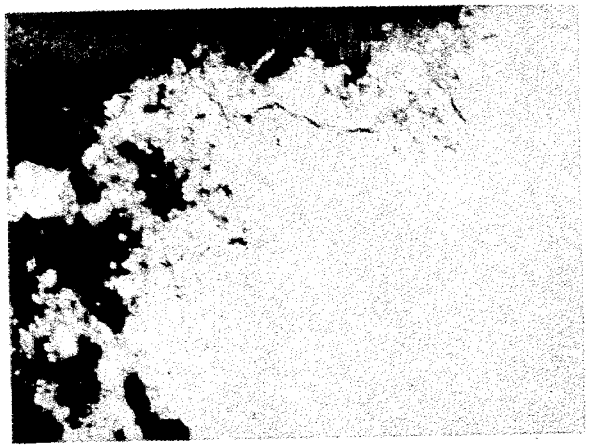
Figure 13:
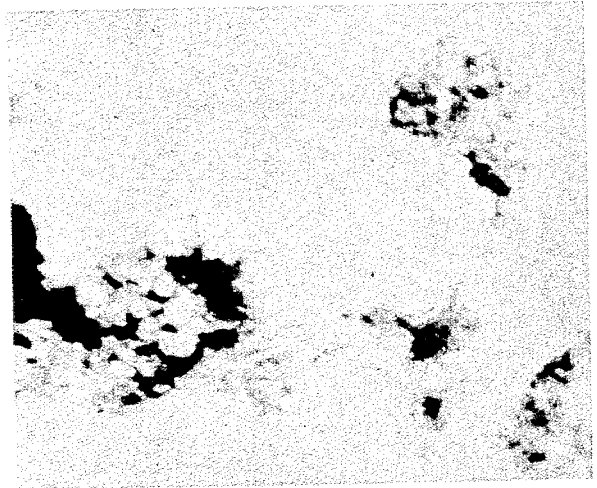

Figures 11, 12 and 13 are electron photomicrographs of greases identified as Formulae Nos. 1, 2 and 3, respectively. Figure 11 reveals an excellent grease characterized by very long thin fiber structure; this is a desired structure for a commercial multipurpose lithium grease. It should be noted that the preparation of this grease included a saponification temperature, in the Stratco contactor, of 360° and an atomization temperature of 330° F. Each of these temperatures is below the solution temperature of the grease, namely, 383° F. The solution temperature is shown in Figure 3 mentioned hereinabove.

Figure 12 shows small particles with an occasional fiber. This is a less desirable lithium grease, in that such a grease has more limited utility. However, this product is advantageous for lubricating high speed gearing wherein it is necessary that the grease become more fluid during use in the zone where the gear teeth mesh. Attention is directed to the conditions employed in the preparation of this product. The saponification temperature was 423° F. and the atomization temperature was 360° F. In other words, the saponification temperature was above and the atomization temperature was below, the solution temperature of 383° F.

Figure 13 shows a gel with practically no fibers in evidence. Conditions used in the preparation of this product included a saponification temperature of 420° F. and an atomization temperature of 383° F. That is, the saponification was above and the atomization temperature equal to, the solution temperature. As pointed out above, it is necessary that the atomization temperature be below the solution temperature in order that a satisfactory product be obtained.

Inspection of data provided on physical properties of Formulae Nos. 1, 2 and 3, reveal a relationship with photomicrograph evidence. As shown, mechanical stability and yield of the products are best for No. 1 (Figure 11) and are worst for No. 3 (Figure 13). Thus, No. 3 is an undesirable product in view of its structure, soft character, and roll test and worker test values. It can be concluded, then, that the character of a product can be varied by adjusting both the temperature at which the soap-oleaginous vehicle mixture is constituted and the temperature at which the mixture is atomized relative to the solution temperature of said mixture, it being understood that the atomization temperature is below the solution temperature.

EXAMPLE VI

Example VI illustrates the preparation and properties of a lithium-calcium stearate-wool grease soap grease of the character described in Butcosk application Serial No. 623,290, filed November 20, 1956, now Patent No. 2,842,493, issued July 8, 1958.

All of the ingredients were charged to the Stratco contactor. The charge was heated and mixed to a temperature of 345° F. It was then sprayed at a pressure of 1400 p.s.i. The nozzle used was a grooved-core nozzle having four grooves, 0.020 inch by 0.035 inch, and having an orifice of 0.0514 inch. Again, cooling air was directed to the dispersed grease droplets as they emerged from the nozzle outlet, in order to obtain a low grease temperature after atomization. The air temperature was 80° F. and the rate of air flow was about 100 cubic feet per minute per pound of grease.

The solution temperature of this grease is about 380° F. It is to be noted that the saponification temperature in the contactor was 345° F. and that the temperature of the oil-soap mixture charged to the nozzle was 315° F. Thus, each is below the solution temperature of the grease.

*Lithium-calcium stearate-wool grease soap grease*

| | Wt. Percent |
|---|---|
| Hydrogenated Tallow Fatty Acids | 8.0 |
| Woolgrease Fatty Acids | 3.0 |
| Lithium Hydroxide Monohydrate | 1.69 |
| Lime Flour | 0.22 |
| Oxidation Inhibitor a | 0.63 |
| Solvent Refined Coastal Oil, 500 SUS @ 100° F | 86.46 |
| Process Conditions: | |
|   Temperature in Stratco Contactor, °F | 345 |
|   Nozzle Pressure, p.s.i. | 1,400 |
|   Temperature before Nozzle Outlet, °F | 315 |
|   Temperature after Atomization, °F | 200 |
| Physical Properties of Finished Grease: | |
|   Penetration ASTM— | |
|     Unworked | 254 |
|     Worked 60X | 284 |
|     Worked 50,000 X 1/16" Holes | 342 |
|   Rolling Stability Test— | |
|     Micro Penetration—Initial | 82 |
|     Micro Penetration—After 2 Hours | 136 | a Mixture of mono and diheptyl diphenylamines.

Throughout this specification, reference has been made to finished grease structure of thickening agent. By this it is meant that the type of crystalline structure, the distribution of thickener particles throughout the product, and the proportion of large and small thickener particles is of the same nature as in the finished grease, remembering that in some cases a controlled time or "dwell" period after atomization may be necessary to permit growth of thickener particles to optimum sizes, while in many cases the optimum size may be obtained during the mechanical atomization step.

Although the invention has been illustrated hereinabove by mineral oil vehicles, it is to be understood that other oleaginous vehicles can also be used in this new manufacturing technique. In place of all or part of the mineral oil vehicle, other oils of lubricating viscosity can be used. Such oils include synthetic vehicles comprising polymerized olefins, esters of various dibasic acids, esters of polyalcohols and monocarboxylic acids, silicones, silicate esters, esters of phosphorus-containing acids, fluorocarbons, perfluoroalkyl ethers, perfluoroalkyl amines, etc. Typical of such synthetic oils are: polypropylene, polypropylene glycol, di-(2-ethyl hexyl) sebacate, di-(2-ethyl hexyl) adipate, dibutyl phthalate, polyethylene glycol di-(2-ethyl hexoate), polymethylsiloxane. The synthetic vehicles are most suitable for providing greases for use in aircraft, since many of the greases retain their lubricating value over a wide temperature range, from about −100° F. to about 500° F. In general, the mineral oils and synthetic lubricants which can be used herein are characterized by a viscosity (S.U.V.) of greater than about 40 seconds at 100° F., preferably from about 60 to about 6000 seconds at 100° F.

While the nature of this invention has been described in considerable detail and various illustrations have been given for improved procedures for the preparation of specific grease compositions, it is to be understood that the invention in its broader aspects is not limited thereto but includes numerous modifications and variations of mechanical atomization of grease mixtures into a substantially cooler surrounding atmosphere as set forth in the appended claims.

We claim:

1. The method of making grease which comprises: constituting a mixture comprising an oleaginous vehicle, a saponifying agent and a fatty material selected from the group consisting of a fatty acid and a glyceride; forming a soap thickening agent in situ in the vehicle, and cooling the resultant mixture to a temperature below its solution temperature when the soap thickening agent is formed at a temperature above the solution temperature; subjecting the resulting vehicle-soap mixture, at a temperature above about 212° F. and below its solution temperature, to mechanical atomization into dispersed droplets and instantaneously contacting the said droplets directly with a substantially cooler surrounding atmosphere to effect heat exchange thereof, thereby forming a grease.

2. The method of claim 1 wherein said dispersed droplets are instantaneously cooled by convection heat exchange with a substantially cooler surrounding atmosphere.

3. The method of claim 1 wherein said dispersed droplets are instantaneously cooled by convection heat exchange with substantially cooler air.

4. The method of claim 1 wherein the oleaginous vehicle is a mineral oil.

5. The method of claim 1 wherein a mixture of soaps are formed in situ in the vehicle.

6. The method of claim 1 wherein the resulting vehicle-soap mixture is at a temperature from about 10° F. to about 100° F. below its solution temperature when subjected to mechanical atomization.

7. The method of claim 1 wherein the resulting vehicle-soap mixture is at a temperature from about 20° F. to about 50° F. below its solution temperature when subjected to mechanical atomization.

8. The method of claim 1 wherein the resulting vehicle-soap mixture is at a temperature from about 10° F. to about 100° F. below its solution temperature and at least about 25° F. below the temperature at which the soap was formed in situ, when subjected to mechanical atomization.

9. The method of claim 1 wherein said grease is subjected to further homogenization following mechanical atomization.

10. The method of making grease which comprises: constituting a mixture comprising an oleaginous vehicle, a saponifying agent and a fatty material selected from the group consisting of a fatty acid and a glyceride; forming a soap thickening agent in situ in the vehicle at a temperature below the solution temperature of the vehicle-soap mixture; subjecting the resulting vehicle-soap mixture, at a temperature above about 212° F. and below its solution temperature, to mechanical atomization into dispersed droplets and instantaneously contacting the said droplets directly with a substantially cooler surrounding atmosphere to effect heat exchange thereof, thereby forming a grease.

11. The method of claim 10 wherein said dispersed droplets are instantaneously cooled by convection heat exchange with a substantially cooler surrounding atmosphere.

12. The method of claim 10 wherein said dispersed droplets are instantaneously cooled by convection heat exchange with substantially cooler air.

13. The method of claim 10 wherein the oleaginous vehicle is a mineral oil.

14. The method of claim 10 wherein a mixture of soaps are formed in situ in the vehicle.

15. The method of claim 10 wherein the resulting vehicle-hoap mixture is at a temperature from about 10° F. to about 100° F. below its solution temperature when subjected to mechanical atomization.

16. The method of claim 10 wherein the resulting vehicle-soap mixture is at a temperature from about 20° F. to about 50° F. below its solution temperature when subjected to mechanical atomization.

17. The method of claim 10 wherein the resulting vehicle-soap mixture is at a temperature from about 10° F. to about 100° F. below its solution temperature and at least about 25° F. below the temperature at which the soap was formed in situ, when subjected to mechanical atomization.

18. The method of claim 10 wherein said grease is subjected to further homogenization following mechanical atomization.

19. The method of forming a lithium soap grease containing a minor proportion of calcium and having a solution temperature of about 366° F., which comprises: constituting a mixture of a mineral oil, lithium hydroxide, lime and fatty material; forming lithium and calcium soaps in situ in the oil at a temperature of about 350° F.; subjecting the resulting vehicle-soaps mixture, at a temperature of about 310° F., to mechanical atomization into dispersed droplets and instantaneously contacting the said droplets directly with a substantially cooler surrounding atmosphere to effect heat exchange thereof, thereby forming a grease.

20. The method of forming a calcium soap complex grease having a solution temperature of about 600° F., which comprises: constituting a mixture of a mineral oil, lime, conventional fatty material and a minor amount (by weight) of a monocarboxylic aliphatic acid containing up to six carbon atoms per molecule; forming a complex calcium soap in the oil at a temperature of about 400° F.; subjecting the resulting oil-complex calcium soap mixture, at a temperature of about 365° F., to mechanical atomization into dispersed droplets and instantaneously contacting the said droplets directly with a substantially cooler surrounding atmosphere to effect heat exchange thereof, thereby forming a grease.

21. The method of forming a grease containing sodium and calcium soaps and having a solution temperature above about 480° F., which comprises: constituting a mixture of mineral oil, lime, sodium hydroxide and fatty acids; forming sodium and calcium soaps in the oil at a temperature of about 400° F.; subjecting the resulting oil-soaps mixture, at a temperature of about 355° F., to mechanical atomization into dispersed droplets and instantaneously contacting the said droplets directly with a substantially cooler surrounding atmosphere to effect heat exchange thereof, thereby forming a grease.

22. The method of forming a lithium hydroxystearate soap grease having a solution temperature of about 383° F., which comprises: constituting a mixture of a mineral oil, lithium hydroxide, hydroxystearic acid and stearic acid; forming lithium hydroxystearate and lithium stearate soaps in the oil at a temperature of about 360° F.; subjecting the resulting oil-soaps mixture, at a temperature of about 330° F., to mechanical atomization into dispersed droplets and instantaneously contacting the said droplets directly with a substantially cooler surrounding atmosphere to effect heat exchange thereof, thereby forming a grease.

23. The method of forming a grease having a solution temperature of about 380° F. and containing lithium and calicum soaps of wool grease fatty acids and of stearic acid, which comprises: constituting a mixture of lithium hydroxide, lime, wool grease fatty acids and stearic acid; forming lithium and calcium soaps of said acids in the oil at a temperature of about 345° F.; subjecting the resulting oil-soaps mixture, at a temperature of about 315° F., to mechanical atomization into dispersed droplets and instantaneously contacting the said droplets directly with a substantially cooler surrounding atmosphere to effect heat exchange thereof, thereby forming a grease.

24. The method of making grease which comprises: constituting a mixture comprising an oleaginous vehicle, a saponifying agent and a fatty material selected from the group consisting of a fatty acid and a glyceride; forming a soap thickening agent in situ in the vehicle, and cooling the resultant mixture to below its solution temperature when the soap thickening agent is formed at a temperature above the solution temperature; subjecting the resulting vehicle-soap mixture, at a temperature above about 212° F. and below its solution temperature, to mechanical atomization into dispersed droplets and instantaneously contacting the said droplets directly with a substantially cooler surrounding atmosphere to effect heat exchange thereof, thereby forming a grease; and recycling said grease to further mechanical atomization and instantaneously contacting the droplets resulting therefrom with a substantially cooler surrounding atmosphere to effect additional heat exchange thereof.

References Cited in the file of this patent

UNITED STATES PATENTS

| | | |
|---|---|---|
| 2,433,636 | Thurman | Dec. 30, 1947 |
| 2,652,366 | Jones et al. | Sept. 15, 1953 |